Patented July 2, 1929.

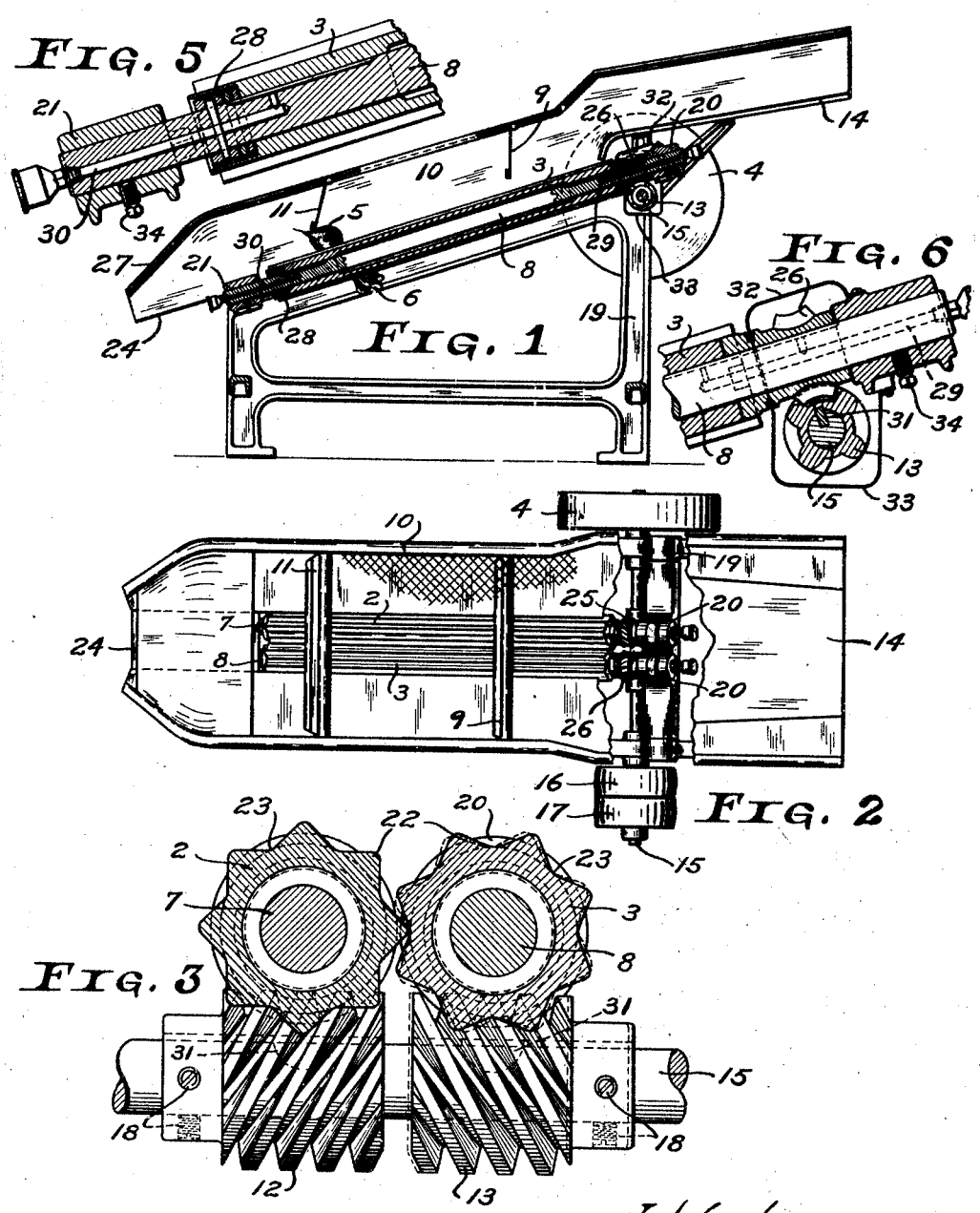
July 2, 1929. O. H. HANSEN 1,718,954
BEET TOPPER
Filed Jan. 19, 1924

1,718,954

UNITED STATES PATENT OFFICE.

OSWALD H. HANSEN, OF PORT WASHINGTON, WISCONSIN, ASSIGNOR TO HANSEN CANNING MACHINERY CORPORATION, OF CEDARBURG, WISCONSIN, A CORPORATION OF WISCONSIN.

BEET TOPPER.

Application filed January 19, 1924. Serial No. 687,191.

This invention relates in general to improvements in the art of preparing edible vegetation for consumption, and relates more specifically to improvements in the construction and operation of machines for automatically and effectively removing leaves and other superfluous vegetation from beets, corn and the like.

An object of the invention is to provide a machine for removing superfluous vegetation and dirt from beets, corn and the like, which is simple in construction and efficient in operation.

Some of the more specific objects and advantages of the present improvement, are as follows:—

To provide simple, compact and efficient mechanism for automatically removing from edible substances, superfluous vegetation such as leaves and roots from vegetable bulbs, or husks and silk from corn on the cob.

To provide a vegetable topping machine of relatively simple and inexpensive construction, which has enormous capacity and which effectively removes all superfluous vegetation and dirt from the tubers without damaging them.

To provide efficient adjusting means for readily varying the operating characteristics of vegetable and corn treating machines in order to maintain high efficiency of operation at all times.

To provide a topping machine structure in which the driving elements, bearings and other parts are effectively protected against injury and dirt, and wherein efficient lubrication of the wearing parts and bearings may be conveniently effected.

To provide improved roll structure, mounting and driving mechanism for beet toppers, corn huskers and similar machines.

To provide means for automatically and effectively feeding, transporting and distributing the objects being treated, through machines of this character and along the treating rolls.

To provide various improvements in beet topping and corn husking mechanisms, which will reduce to a minimum the cost of manufacture and operation, and which will enhance the efficiency thereof.

Several of the novel features of beet topping machine structure disclosed but not specifically claimed herein, form the subject of copending application Serial No. 670,429, filed October 24, 1923.

A clear conception of an embodiment of the present invention and of the operation of mechanisms constructed in accordance therewith, may be had by referring to the drawing accompanying and forming a part of this specification in which like reference characters designate the same or similar parts in the several views.

Fig. 1 is a longitudinal vertical section taken through one of the rolls of an improved beet topping machine.

Fig. 2 is a top view of the improved beet topping machine having the cover removed and also having portions broken away in order to more clearly disclose improvements in the structure.

Fig. 3 is a fragmentary enlarged transverse section taken across the improved topping rolls.

Fig. 4 is a transverse section taken through the rolls and beet distributing elements of the improved machine.

Fig. 5 is a fragmentary enlarged longitudinal section through the lower roll supporting structure.

Fig. 6 is a fragmentary enlarged longitudinal section through the upper roll supporting and driving structure.

While the invention is disclosed herein as being specifically applied to a beet topping machine, it will be apparent that the improvements are capable of more general application to machines for treating other commodities such as corn on the cob, and the specific disclosure is not to be considered as an intent to restrict the scope of the invention.

The beet topping machine illustrated in the drawing, comprises in general a stationary main frame 19; a pair of oppositely rotatable parallel fluted inclined rolls 2, 3; a pair of stationary parallel inclined roll supporting shafts 7, 8 removably mounted in fixed supports 20, 21 on the frame 19; a hopper 10 for confining the beets to a course of travel along the rolls 2, 3; a supply chute 14 for delivering the beets toward the hopper 10; a discharge chute 24 for delivering the dressed beets from the machine; and mechanism for continuously rotating the rolls 2, 3 upon their respective supporting shafts 7, 8. The stationary main frame 19 comprises horizontally spaced upright side members interconnected by means of horizontal frame members with the upper of which the supports 20, 21 may be formed integral.

The fluted topping rolls 2, 3 are of hollow formation and are preferably of identical structure in order to permit interchangeability thereof. The rolls 2, 3 are of uniform star-shape cross-section throughout their lengths and have alined end bores forming bearing surfaces.

The longitudinal ridges of the rolls 2, 3 have rounded crests 22 and the grooves between the successive ridges are obtuse angled and have rounded troughs 23 as clearly indicated in Fig. 3. Each roll preferably has an equal number of ridges and several ridges of each roll have surfaces lying in a common plane in order to facilitate construction of the rolls. The rolls 2, 3 are also devoid of cutting edges which might tend to damage the beets as they bound and roll along the rolls.

The stationary inclined parallel shafts 7, 8 coact with the end bores of the rolls 2, 3 respectively, and are provided with lubricating passages 29, 30 for distributing grease or oil to the roll bearings. The shafts 7, 8 are detachably secured to the supports 20, 21 by means of set screws 34. Thrust collars 28 are detachably secured to the shafts 7, 8 and coact with lower end surfaces of the rolls 2, 3 in order to prevent downward displacement of the rolls. The rolls are preferably provided with recesses within which the collars 28 are located in order to prevent ingress of dirt, and the thrust bearings provided by the collars 28 may be lubricated through the lower passages 30.

The roll driving mechanism comprises helical gears 25, 26 detachably connected to the upper extremities of the rolls 2, 3 respectively by virtue of tongue and groove connections; axially adjustable alined helical gears 12, 13 meshing with the gears 25, 26 respectively; a horizontal power shaft 15 mounted in bearings in the main frame 19 and supporting the gears 12, 13; and driving and idler pulleys 16, 17 associated with an end of the power shaft 15. The opposite end of the power shaft 15 may be provided with a fly wheel 4 for the purpose of inducing uniform rotation of the topping rolls 2, 3 when the hopper 10 is loaded. The helical gears 12, 13 are drivingly connected to the power shaft 15 by means of splines 31 and set screws 18, and may be adjusted longitudinally of the shaft 15 upon release of the set screws 18. The gears 12, 13 are enclosed by means of a detachable lower cover 33, and the gears 25, 26 are likewise enclosed and protected by means of a detachable upper cover 32.

The supply chute 14 is located above the shaft 15 and the motion transmitting gearing thereby protecting these elements and preventing ingress of dirt to the bearings. The beet confining hopper 10 comprises laterally spaced inclined sheet metal walls rigidly supported from the main frame 19. The discharge chute 24 may also be formed of sheet metal, and the entire machine may be provided with a readily removable sheet-metal cover 27 coacting with the hopper side walls. The hopper 10 is preferably provided with two or more pivoted flaps 9, 11 disposed transversely of and above the rolls 2, 3 for the purpose of uniformly distributing and preventing excessive bouncing of the beets.

During normal operation of the improved topping machine, the rolls 2, 3 are being rotated continuously in opposite directions by means of power applied to the power shaft 15 from the pulleys 16, 17, and from the power shaft 15 to the rolls 2, 3 through the helical gears 12, 13, 25, 26. As viewed in Figs. 3 and 4, the roll 2 rotates in a clockwise direction, and the roll 3 rotates in a counterclockwise direction, the relative rotation of the rolls 2, 3 being such that the ridges of one roll mesh with the grooves of the other without actually engaging each other. The beets which are to be treated, are delivered in bulk and in the condition in which they are received from the field, into the topping chamber along the supply chute 14. As the mass of beets is deposited upon the rotating rolls 2, 3, the individual beets are tumbled about until the tops 6, protruding roots and other superfluous projections thereon are eventually drawn downwardly between the cooperating roll ridges and troughs and are quickly nipped from the bulbs 5. The removed tops 6 and other superfluous vegetation drops by gravity to the space between the side members of the frame 19, from whence it may be removed as desired. The bulbs 5 continue to advance by gravity along the rotating rolls 2, 3 and have their surfaces thoroughly scoured by the time they reach the lower ends of the rolls whereupon the cleaned bulbs 5 are eventually delivered through the discharge chute 24. During transgression of the beets through the machine, the successive pivoted flaps 9, 11 automatically serve to prevent excessive bouncing of the bulbs 5 and uniformly distribute the beets over the rolls 2, 3 thus insuring topping of every individual beet admitted to the machine.

As the efficiency of the machine is largely dependent upon the proper relative disposition and cooperation of the ridges and troughs of the rolls, 2, 3, which relation must be maintained even when the rolls become worn, the rolls 2, 3 are preferably provided with means for effecting relative angular adjustment thereof. Such adjustment may be readily effected by releasing the locking set screws 18 of one of the helical gears 12, 13 and sliding the released gear along the power shaft 15 a sufficient distance to establish proper relative disposition of the ridges and troughs of the rolls 2, 3 which will be relatively angularly displaced during relative axial shifting of the gears 12, 13. While it is preferable in order to eliminate excessive wear in the rolls 2, 3 that these rolls should not come in actual contact with each other, it is desirable in order to produce most effective nipping and removal of the leaves 6, to reduce the space between the cooperating roll portions to a minimum. When the proper adjustment of the rolls 2, 3 has been effected, the released gears 12, 13 may again be locked to the shaft 15 by tightening the set screws 18 thereof, whereupon the machine is again ready for operation. The helical gears 12, 13, 25, 26 besides permitting convenient adjustment of the rolls 2, 3 automatically compensate for lost motion between the power shaft 15 and the rolls.

The housings or covers for the gearing may be filled with grease in order to insure proper lubrication of the gears, and the grease cups at the extreme ends of the shafts 7, 8, serve to supply lubricant to the roll bearings through the passages 29, 30. The lower grease cups of the shafts 7, 8 serve to lubricate both the longitudinal lower bearings between the rolls 2, 3 and the shafts 7, 8, and the thrust bearings afforded by the thrust collars 28. The bearings of the power shaft 15 may also be provided with readily accessible lubricating means, thereby permitting convenient lubrication of all moving parts of the mechanism.

It will also be noted that all of the bearings are effectively protected from injury and ingress of dirt. The stationary roll supporting shafts 7, 8, besides permitting disposition of the roll bearings entirely within the rolls 2, 3, provide relatively long bearings for the rolls without undesirably lengthening the machine. The lower thrust bearings are also located entirely within the rolls 2, 3 and the bearings of the driving gears and power shaft 15 are protected by the supply chute 14 which may be made freely removable in order to permit convenient access to the driving elements.

The entire machine may be quickly dismantled with the aid of ordinary tools such as a screw driver and a wrench. By releasing the set screws 34 and the transverse keys for the thrust collars 28, the stationary shafts 7, 8 may be removed endwise from within the supports 20, 21, the thrust collars 28, rolls 2, 3, and the gears 25, 26. The gears 25, 26 are then freely removable from the rolls 2, 3 by virtue of the tongue and groove connections between these elements. The power shaft 15 is readily removable from its supporting bearings and the gears 12, 13 may be slid endwise from this shaft upon release of the set screws 18. The use of a fly wheel 4 associated with the power shaft 15 also permits utilization of relatively light rolls 2, 3. Besides the rolls 2, 3, the shafts 7, 8 are identical in structure thus making these elements interchangeable. All of the elements of the machine are accurately machinable and in spite of its simplicity, the machine has enormous capacity.

It should be understood that it is not desired to limit the invention to the exact details of construction and operation herein shown and described, for various modifications within the scope of the appended claims may occur to persons skilled in the art.

It is claimed and desired to secure by Letters Patent:—

1. In combination, a pair of cooperating rolls rotatable in opposite directions to remove appendages from objects traveling therealong and disposed to deliver the treated objects over the corresponding ends thereof, and means providing supporting bearings located entirely within said rolls and shielded from contact with the objects treated by the rolls.

2. In combination, a pair of rotatable rolls having cooperating ridges and grooves formed to remove appendages from objects traveling therealong and disposed to deliver the treated objects over the corresponding roll ends, and stationary shafts providing internal supporting bearings for the rolls shielded from contact with the objects treated.

3. In combination, a pair of oppositely rotatable rolls cooperable to remove appendages from objects and longitudinally inclined to deliver the objects therealong and over the corresponding lower roll ends, and means providing thrust bearings located entirely within the lower roll ends and shielded from contact with the objects delivered over said ends.

4. In combination, a pair of oppositely rotatable rolls having cooperating ridges and grooves formed to remove appendages from objects traveling therealong, said rolls being longitudinally inclined to deliver the treated objects over the corresponding lower ends thereof, stationary shafts forming internal supporting bearings for said rolls, and thrust bearings located entirely within said rolls, said shafts and said thrust bearings being shielded from contact with objects delivered over said roll ends.

5. In combination, a pair of cooperating longitudinally inclined rolls rotatable in opposite directions to remove appendages from objects traveling therealong and disposed to deliver the treated objects over the lower roll ends, stationary shafts providing internal supporting bearings for the rolls shielded from contact with the objects treated, and gears detachably connected to the upper roll ends and journaled on said shafts for imparting rotary motion to said rolls.

6. In combination, a pair of cooperating longitudinally inclined rolls rotatable in opposite directions to remove appendages from objects traveling therealong and disposed to deliver the treated objects over the lower roll ends, stationary shafts providing internal supporting bearings for the rolls shielded from contact with the objects treated, gears detachably associated with the upper ends of the rolls and journaled on said shafts for imparting rotary motion to said rolls, and means for feeding objects to be treated to said rolls over said gears and for shielding said gears from contact with said objects.

In testimony whereof, the signature of the inventor is affixed hereto.

OSWALD H. HANSEN